April 28, 1964 J. F. O'NEILL, JR 3,131,258

REGENERATIVE DETECTOR FOR FREQUENCY-SHIFT DATA SIGNALS

Filed Dec. 21, 1961

INVENTOR
J. F. O'NEILL, JR.
BY J. P. Kearns, Jr.
ATTORNEY 3,131,258

REGENERATIVE DETECTOR FOR FREQUENCY-SHIFT DATA SIGNALS

John F. O'Neill, Jr., Eatontown, N.J., assignor to Bell Telephone Laboratories, Incorporated, New York, N.Y., a corporation of New York Filed Dec. 21, 1961, Ser. No. 161,149
10 Claims. (Cl. 178—66)

Figure 1:
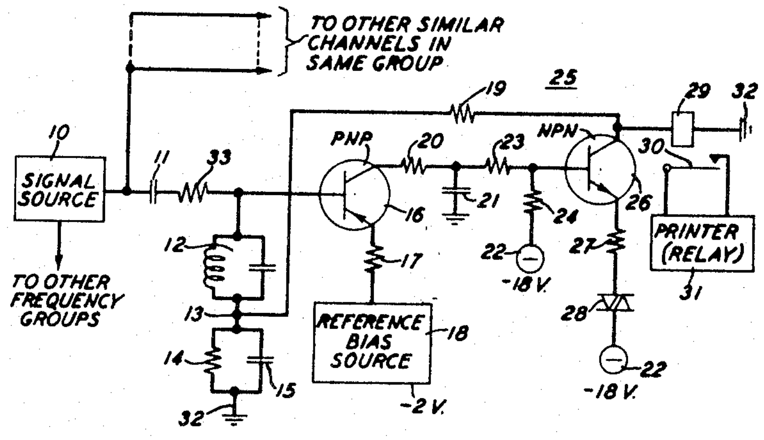

This invention relates generally to the reception of frequency-shift data signals and in particular to a regenerative detector for such signals.

In the reception of frequency-shift data and telegraphic signals the problem of compensating for bias or amplitude distortion at the receiving station frequently arises. The tone bursts in which the information is encoded at times are generated in ringing circuits as exponentially damped waves or may degenerate in traversing the transmission medium into damped oscillatory waves. At other times the tone burst may arrive off-frequency at the receiver and cause a ringing response in a resonant detector circuit. The detection system may include a threshold level below which noise and other spurious signals are rejected. The threshold level is established so that the initial portion of a legitimate signal lies well above it to cause operation of the detector, but the decaying trailing portions may fall below the threshold level in too short a time to effect positive operation of printing relays driven from the detector circuit.

It is a principal object of this invention to compensate for the falling off in level of tone bursts in data and telegraph receivers and insure a detector output for the full length of the tone burst.

It is another object of this invention to regenerate in a simple and economical manner damped tone bursts of a single frequency impressed on a detector circuit requiring an input signal to exceed a given threshold level for reception.

It is still another object of this invention to increase the sensitivity of a tone burst detector circuit after the initial surge has cleared the threshold detection level.

It is a further object of this invention to reduce the threshold bias level of a detector circuit after the initial enhanced transient portion of a tone burst has been received.

According to this invention, a detector circuit for single-frequency tone bursts is provided with a direct-coupled feedback circuit to transfer a portion of the output energy to the input in a sense to reduce the effective threshold level of the input circuit after the initial surge of a continuous signal has first exceeded the initial threshold level. Two of these detector circuits can be connected in parallel to a transmission line to demodulate a frequency-shift data signal. Each detector is then provided with a resonant circuit responsive to the marking and spacing frequencies.

According to a specific embodiment of this invention a two-stage common-emitter amplifier having a cut-off reference bias on the tuned input stage is provided with a direct-coupled feedback loop from the collector of the output stage to the base of the input stage to apply a dynamic bias in a direction to oppose the reference bias and thereby reduce the effective threshold level of the detector after the initial segment of a damped signal wave is detected. The duration of the output wave relative to that of the input wave is thereby increased over the output wave duration economically and conveniently attainable without such feedback circuit. The printing relay is then assured of an operating pulse of long enough duration for positive operation. Upon the termination of the input signal burst the detector circuit has its normal threshold level restored.

A feature of this invention is that the feedback circuit is constituted of a simple resistive voltage divider.

Another feature of this invention is that this feedback arrangement permits the detection of the peak of an oscillatory transient on a resonant network rather than a delayed detection of the steady response of the resonant network, thereby favoring high speed operation of the detector.

Figure 2:
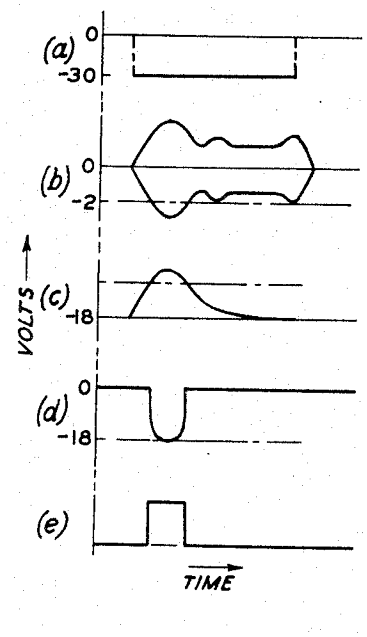
Figure 3:
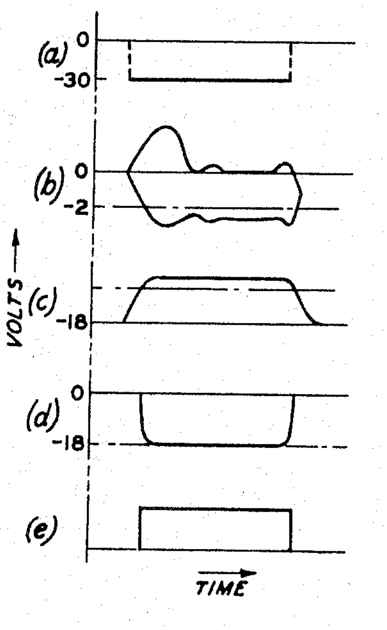

Other objects, features and advantages of this invention will become apparent upon a consideration of the following detailed description and the drawing in which:

FIG. 1 is a circuit diagram of a specific embodiment of the improved detector of this invention; and FIGS. 2 and 3 are waveform-diagrams of aid in explaining the operation of the circuit of FIG. 1.

In a data transmission system to which this invention is applicable a plurality of tones within the voice frequency band, for example, are transmitted over a telephone line to encode a multiplicity of data characters. The data may originate in a card or tape reader and may involve the closing of two or more switch contacts simultaneously. A plurality of groups of frequencies, each group containing four or more frequencies, has a frequency selected from each group for simultaneous transmission according to the number of switches closed or sensing brushes activated. For example, in a three-out-of-twelve multifrequency system, twelve frequencies are separated into three groups of four frequencies each. For any given message character a single frequency is transmitted from each group simultaneously. This arrangement provides for the transmission of up to sixty-four different message characters.

Between message characters separate rest tones are transmitted from each group. These rest tones are non-information bearing but serve to keep echo suppressors found on some telephone transmission lines in operation. For each message character a frequency shift from rest tone to signal tone and back to rest tone occurs.

At the distant end of the line the several individual tones are first limited and then are detected to close a relay contact corresponding to the presence of each particular tone. For each marking tone there is provided an individual detector channel having in its input a resonant circuit tuned to a particular one of the possible transmitted frequencies. The detector is provided with a threshold bias which the potential across the resonant circuit upon the receipt of the correct tone must exceed in order to operate the detector. Since the relays in the printing equipment controled by the output relays in the detector have a finite operating time, the detector output must persist for some minimum time interval for positive operation of the printing relays. In addition, the printer requires the near-simultaneous operation of two or more relays to print a valid data character. Because of the difficulty of effecting exactly simultaneous closure of several mechanical contacts the several frequencies may be skewed when transmitted. The several tones do not always arrive at the receiver at the same instant. Consequently, it is desirable that the printing relays be held operated for an interval long enough to compensate for these skew effects.

There is another difficulty in this system relating to the practicability of maintaining exact frequency correspondence between the transmitted frequency and the resonant frequency of receiver tuned circuits. A typical tone burst incident on the receiver resonant circuit is off frequency up to thirty cycles or so and causes an initial overshoot, which readily overcomes the threshold bias, but the remainder of the tone burst may degenerate into a damped wave whose peak amplitudes decay below the threshold level. The detector may then release the printing relay prematurely and lose a message character. It is the purpose of this invention to improve the detector in such a way as to compensate effectively for these effects without sacrificing speed and noise-protection capabilities of the overall data transmission system.

FIG. 1 is a circuit diagram of a single channel of a detector circuit having the characteristics described above. Signal source 10 represents a multifrequency signaling transmitter and a transmission line. A burst consisting of two or more signaling tones out of a plurality of frequencies provided is present at one time to represent a particular message character. However, source 10 is also assumed to contain separation filters for the several frequency groups and a limiter for each group to set amplitudes accurately so that only one frequency at a time is applied to any one frequency group. The remainder of FIG. 1 represents a single detection channel for one frequency of a group. Other channels for selection of the other frequencies of a given frequency group are similar and are connected in parallel to the output of source 10 as indicated. Only the tuned circuit are different.

The active elements in the channel include a pair of complementary transistors 16 and 26 in cascade. Transistor 16 is of the p-n-p type having a base region of n-type semiconductive material sandwiched between collector and emitter regions of p-type semiconductive material. Transistor 26 is of the opposite n-p-n type to facilitate direct coupling to transistor 16. Both transistors are connected in the common emitter configuration, that is, the emitter circuit of each is common to the input and output circuits. Transistor 16 has its emitter electrode returned to a reference bias source 18 of about two volts negative. The collector electrode is connected to a supply potential of eighteen volts negative through resistors 20, 23 and 24. Capacitor 11 coupling signal source 10 to the base electrode of transistor 16 blocks any direct-current potential in the signal source. Resistor 33 provides isolation among the several paralleled frequency detectors. In the quiescent state transistor 16 is clearly non-conducting.

The base circuit includes a parallel circuit 12 having an inductor and a capacitor resonant at one of the signaling frequencies and in series therewith at junction point 13 a parallel circuit including resistor 14 and capacitor 15. The other ends of resistor 14 and capacitor 15 are connected to a group reference point 32. Capacitor 15 has negligible impedance at the resonant frequency of the tuned circuit, and may be omitted if the resistance of resistor 14 is small compared to the impedance of tuned circuit 12 at resonance.

Transistor 26 has its emitter electrode connected to the eighteen-volt-negative supply 22 through resistor 27 and varistor 28. Resistor 27 and varistor 28 may be shared by other detector channels in a given frequency group so that only one channel at a time can respond. The voltage drop across resistor 27 and varistor 28 increases the reverse bias on the second stages of these other detectors and provides additional margin against false operation on noise or transient signals. The varistor acts like a one-volt battery when current flows to hold the emitter slightly less negative than the base electrode. The collector electrode is connected to ground reference point 32 through the operating winding of output relay 29, which preferably has a high resistance to furnish sufficient voltage drop for collector saturation when current flows. The relay has a set of normally open contacts 30 which upon operation close a circuit to printer 31. The base electrode is also returned to the eighteen-volt-negative potential supply source 22 through resistor 24. Consequently, transistor 26 is also normally in the non-conducting state. The base electrode of transistor 26 is further directly coupled to the collector electrode of transistor 16 through resistors 20 and 23 in series. However, the impedance of capacitor 21 is low at the detection frequency to prevent the transmission of signal frequencies to transistor 26.

It will be understood that with appropriate changes in polarity the positions of the complementary transistors may be reversed.

The detector circuit as so far described operates in the following manner for an ideal signal impulse at the frequency to which resonant circuit 12 is tuned. Responsive to the applied tone burst the potential across tuned circuit 12 rapidly builds up to a value exceeding the reference bias voltage and the negative cycles cause transistor 16 to conduct. Collector current drawn through resistor 20 charges capacitor 21 in the positive direction until the positive bias on the emitter of transistor 26 is exceeded. The potential across capacitor 21 is applied to the base of transistor 26 through a voltage divider comprising resistors 23 and 24 because there is only about one volt of back bias to be overcome. Transistor 26 is thrown into conduction and collector current is drawn through the winding of relay 29. The collector voltage of transistor 26 falls toward a negative seventeen volts. Although relay 29 requires only a few milliseconds of input to operate positively, relays in the printing equipment are slower acting.

When there is perfect correspondence between the resonant frequency of the tuned circuit and the frequency of the signal burst, no detection problem arises. However, if, due to mistuning of the transmitter or receiver resonant circuits, frequency shifts in the transmission line due to carrier system imperfections, or aging of the circuits, the incoming frequency is off resonance, there will result an initial overshoot exceeding the reference bias in the potential across the tuned circuit followed by a decaying oscillation at a frequency which is the difference between the actual signal frequency and the resonant frequency. The potential across the tuned circuit for frequencies off resonance necessarily falls off rapidly, and after the initial surge this potential is likely to fall and remain below the reference bias level because of known characteristics of resonant circuits. Therefore, the output relay will be operated for only a fraction of the duration of the input signal. This time may well be too short to operate the printing relay positively, especially in view of the possible skew in the occurrence of input signals in a multifrequency message character.

To correct for this defect according to this invention the feedback path 25 is inserted between the collector electrode of the output transistor and the base circuit of the input transistor at junction point 13. Resistor 19 in feedback path 25 and base resistor 14 form a voltage divider so that a portion of the seventeen-volt fall in potential at the collector of transistor 26 appears across resistor 14. The values of these resistors are chosen in the exemplary circuit to produce about one volt across resistor 14. Capacitor 15 rapidly charges to this potential and holds it for the duration of the output signal. The net bias across the base-emitter junction of transistor 16 is reduced to one volt and transistor 16 is held in the conducting state for the full duration of the input signal.

FIGS. 2 and 3, respectively, show several waveforms of interest in the detector circuit without and with feedback. Portions (*a*) of the figures are identical and show the envelope of the input signal after passing through a limiter circuit (assumed part of signal source 10). Portions (*b*) of the figures show the envelope of the voltage across the tuned circuit 12 responsive to a frequency slightly above resonance. It is apparent that only the transient overshoot of FIG. 2 exceeds the reference bias. In the corresponding portion of FIG. 3 due to the one volt of feedback the envelope is shifted in the negative direction after the initial overshoot and the negative side of the envelope remains well below the reference bias for the duration of the input signal. Portion (*c*) of the figures shows the charge on integrating capacitor 21. In FIG. 2 the capacitor is charged only during the overshoot, whereas in FIG. 3 the charge is maintained for the duration of the input signal. Portions (*d*) of the figures show the voltage across relay 29 under the two conditions of operation. Portions (*e*) of the figures represent the duration of the contact closure of relay 29.

The difference in operation with and without feedback is readily apparent from FIGS. 2 and 3. With feedback the duration of the relay closure is not limited by the duration of the transient overshoot, but is sustained for the duration of the input signal since the peak signal cannot fall by an amount greater than the feedback voltage. Even for driving signals exactly at resonance when no overshoot occurs, the feedback adds tolerances to changes in the signal due to noise, power supply ripple and other such disturbances. There is no delay in the response of the printing relay as there would be in detection systems using gating circuits or the steady-response characteristics of resonant circuits. Hence, the speed capabilities of the basic system are preserved.

While the invention has been described with reference to a specific illustrative embodiment, the scope of the invention is not to be limited to the particulars of such disclosure. Other variations will occur to those skilled in the art. The detector may include more or less than two stages and the feedback path may readily be relocated in order to obtain positive feedback. The application of the principles of this invention to electron tube circuits is also apparent.

What is claimed is:

1. A detector for damped alternating-current signal wave bursts comprising
   a source of said signal waves having decreasing peak amplitudes within each burst,
   a tuned detector circuit responsive to said signal waves having an operating threshold level below the initial peak amplitude of said signal wave bursts,
   an input terminal for said detector,
   a reference bias source for establishing said threshold level with respect to said input terminal,
   an output terminal for said detector,
   an indicating device connected to said output terminal,
   a direct-current feedback path between said output and input terminals for transferring a portion of the output energy to the input terminal to oppose the reference bias thereat and effectively reduce said threshold level for the lower peak amplitudes in said signal wave bursts.

2. A detector for damped signal wave bursts at a particular frequency,
   an input and an output terminal,
   two inverting amplifier devices connected in cascade between said input and output terminals,
   a reference bias source for the first device holding it in the non-conducting state,
   a source of damped signals having an initial peak amplitude exceeding said reference bias and successive peaks less than said bias,
   means responsive to said signals for holding said first device in the conducting state after said peak amplitude falls below said reference bias,
   comprising a direct-current feedback path from said output terminal to said input terminal to oppose said reference bias after receipt of the initial peak amplitude exceeding said reference bias.

3. A receiver for data signals encoded as on-off bursts of a particular frequency comprising
   an input terminal,
   a first transistor having base, emitter and collector electrodes,
   a reference bias source connected to said emitter electrode to hold said transistor in a normal non-conducting state,
   a resonant circuit tuned to said particular frequency connected to said input terminal and to said base electrode,
   a bias resistor and a capacitor in parallel therewith, both connected in series with said resonant circuit to a common terminal,
   a second transistor having base, emitter and collector electrodes and of opposite conductivity type from said first transistor in cascade with said first transistor,
   means for biasing said second transistor into a normal non-conductive state,
   an integrating circuit coupling the collector electrode of said first transistor to the base electrode of said second transistor,
   an output circuit connected to the collector electrode of said second transistor,
   and a resistive feedback path between the collector electrode of said second transistor and said common terminal, whereby the net bias on said first transistor is reduced upon said second transistor's becoming conductive to compensate for the reduction in amplitude of said input signal bursts.

4. In combination,
   a source of tone burst signals of finite duration and preassigned frequency representing data signals,
   said tone bursts being subject to frequency displacement in traversing a transmission medium,
   an output relay to be operated for the duration of each of said tone bursts,
   and a detector circuit linking said source and relay comprising
   an input tuned circuit receptive to said tone bursts and resonant at said preassigned frequency, but subject to a transient overshoot for frequencies slightly off resonance,
   a first translating device connected to said input circuit having an operating threshold which is exceeded by the potential across said input circuit when a signal at said preassigned frequency is received and only by the transient overshoot when slightly off-resonance frequencies are received,
   a second translating device in cascade with said first translating device,
   an integrating circuit coupling the output of said first translating device to the input of said second translating device,
   means for connecting said output relay in the output of said second translating device,
   and means for reducing the operating threshold of said first translating device after the initial portion of a signal tone burst is received comprising a direct-current feedback path for transferring a portion of the output of said second translating device to reinforce the potential across said input tuned circuit.

5. The combination of claim 4 in which said first and second translating devices are complementary transistors.

6. The combination of claim 4 in which said feedback path is a resistive voltage divider.

7. A detector for single-frequency alternating-current signals comprising
   a source of alternating-current signals including a particular information-bearing frequency to be detected,
   a resonant circuit responsive to said particular frequency,
   a first translating device coupled to said resonant circuit and having an operating threshold slightly below the peak potential occurring across said resonant circuit when said particular frequency is incident thereon,
   an integrating circuit in the output of said first translating device,
   a second translating device also having an operating threshold and having its input connected to said integrating circuit,
   a relay in the output of said second translating device which is operated when said second device conducts, and
   means for insuring that said relay operates substantially for the duration of the occurrence of said particular frequency even when said particular frequency is off-resonance with respect to the tuning of said resonant circuit comprising a direct-coupled feedback path from the output of said second translating device to said resonant circuit for transferring a portion of the output of said second device to said resonant circuit effectively to shift the average level of the potential at said resonant circuit toward the threshold level of said first device.

8. A detector according to claim 7 in which said first and second translating devices are junction transistors, one having an n-type base region and the other having a p-type base region.

9. A detector according to claim 7 in which said feedback path includes a first resistor in series between said resonant circuit and a ground reference point and a second resistor joining the output of said second device to the junction point between said resonant circuit and said first resistor.

10. A detector according to claim 7 in which said integrating circuit comprises a resistor and a capacitor in series.

References Cited in the file of this patent

UNITED STATES PATENTS

| | | |
|---|---|---|
| 2,512,750 | Potter | June 27, 1950 |
| 2,788,449 | Bright | Apr. 9, 1957 |
| 2,975,301 | Straube | Mar. 14, 1961 |

OTHER REFERENCES

Clapper: "Slope Discriminator," IBM Technical disclosure Bulletin, vol. 3, No. 9, February 1961.